Patented July 18, 1950

2,515,625

UNITED STATES PATENT OFFICE 2,515,625

PROCESS FOR REMOVING THE DARK COLOR FROM WALNUT MEATS

Herman J. Almquist, Modesto, Calif.

No Drawing. Application November 22, 1949, Serial No. 128,925

3 Claims. (Cl. 99—126)

This invention relates to a process for removing the dark color from walnut meats.

Walnut meats are graded in accordance with the lightness of their color, the lighter meats bringing a higher price; meats which are otherwise equally palatable but which are of a dark color, sell for a lower price than meats otherwise of a like quality but which are not of a light color.

Walnut meats can be of a dark color for several reasons, including water, admitted through a crack in the shell, transferring color constituents from the husk; some meats are inherently dark-colored though otherwise inherently of good quality.

I have discovered that by subjecting the walnut meats to successive extractive treatments, the color constituents in the meats, such as the tannins and quinones, can be removed; the process of this invention is one of color extraction rather than bleaching. In addition, the nut meats are improved in flavor for constituents imparting a bitter and sharp flavor are removed.

In accordance with the present invention, the walnut meats are first placed in an alkaline sulfite solution having a pH initially between about 10 and 11. Any alkaline sulfite solution can be utilized providing it does not impart an undesirable taste to the meats, or is not objectionable from a human consumption standpoint. The preferred material is an aqueous solution of sodium sulfite and trisodium phosphate, for this provides the correct pH; this phosphate has the inherent advantage of reducing a change in pH due to its buffering characteristics; about one-half per cent of trisodium phosphate suffices. One can utilize sodium carbonate or sodium hydroxide to establish the desired pH for the sulfite and obtain good results. A phosphate has the further advantage that, upon a subsequent acidification, to neutralize residual alkalinity in the meats, any residual phosphate is converted into an acid phosphate which imparts inherently an anti-oxidant protection to the meats and tends to prevent the return of any dark color to the meats standing in contact with air. In place of sodium sulfite, one can utilize potassium sulfite or calcium or magnesium sulfite; however, calcium sulfite tends to impart a sour taste to the meats so its use is not recommended. One can use from a one-quarter to one-half per cent solution of the sulfite.

To practice the invention, the meats are immersed in the solution. Depending on the extent of color removal desired, they may remain for from one to two hours, or one can use several immersions of relatively shorter duration.

Following the treatment, the meats are removed from the solution and drained and any residual alkali present is neutralized by wetting with an acid solution such as that provided by a dilute hydrochloric acid solution having a pH of about 2. Any acid can be used which does not impart an undesirable taste or render the meats unsuited for human consumption, and one can employ phosphoric acid, tartaric acid and acid salts of these.

As illustrative of one operation carried on in accordance with the present invention, 100 grams of walnut meats of such a dark color as to be of an off-grade were immersed in 500 cc. of an aqueous solution containing ¼% sodium sulfite and ½% trisodium phosphate. The meats were permitted to remain for approximately two hours, following which the now dark-colored solution was drained from the meats. The meats were then neutralized by treatment with 100 cc. of a hydrochloric acid solution of a pH of approximately 3, then washed in water and dried. The meats were then of a fine natural light yellow color and of good, mild flavor. They retained these in contact with the atmosphere for a year.

In place of a batch operation, the operation can be carried out continuously by moving the extracting solution and the meats counter-current to one another.

I claim:

1. A process for extracting the color from walnut meats comprising soaking the meat nuts in an alkaline solution of a sulfite selected from the group consisting of an alkali metal sulfite and an alkaline earth sulfite having a pH between about 10 and 11, for approximately two hours, then separating the meats from the solution, neutralizing residual alkali in the meats, and drying the meats.

2. A process as in claim 1 wherein the alkaline solution includes about ½% of a phosphate.

3. A process for extracting the color from walnut meats comprising soaking the nut meats in a solution containing about ½% trisodium phosphate and ¼%–½% sodium sulfite having a pH between about 10 and 11 for approximately two hours, separating the solution from the meats, neutralizing the residual alkali in the meats with a dilute hydrochloric acid solution, and drying the meats.

HERMAN J. ALMQUIST.

REFERENCES CITED

The following references are of record in the file of this patent:

UNITED STATES PATENTS

| Number | Name | Date |
|---|---|---|
| 1,412,523 | Hochstadter | Apr. 11, 1922 |
| 1,558,963 | Christie | Oct. 27, 1925 |
| 2,182,965 | Ioannu | Dec. 12, 1939 |